June 6, 1933. G. J. VON GLAHN 1,913,222
PIPE CONNECTION
Filed Aug. 16, 1929   2 Sheets-Sheet 2

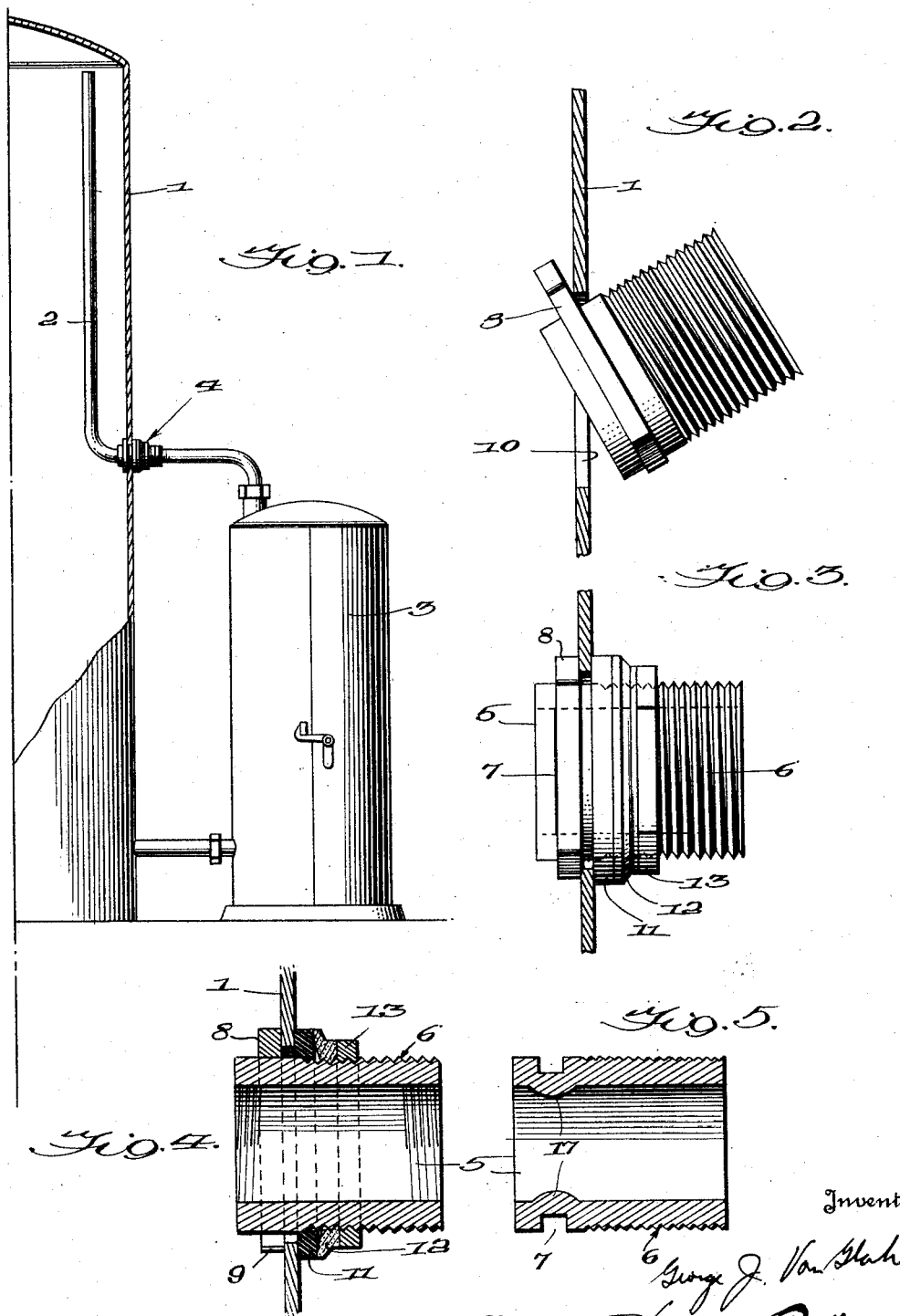

Inventor
George J. Von Glahn
By Vernon E. Hodges
his Attorney

Patented June 6, 1933

1,913,222

UNITED STATES PATENT OFFICE

GEORGE J. VON GLAHN, OF BROOKLYN, NEW YORK

PIPE CONNECTION

Application filed August 16, 1929. Serial No. 386,329.

This invention relates to an improvement in pipe connections.

The object of the invention is to provide an insertable connection for boilers or the like which may be easily installed or removed but will be securely held in place against accidental displacement and which facilitates the connection of a pipe or pipes therewith.

The invention comprises the construction of such a connection in which a sleeve is inserted into an opening in the boiler and has a saddle or yoke thereon to be slipped inside the boiler and to cooperate with a nut or suitable fastening means on the outside of the boiler to securely lock and fasten the sleeve in position and when in place is not accidentally displaced.

In the accompanying drawings:

Fig. 1 is a side elevation partly in section showing the invention applied;

Fig. 2 is an enlarged similar view showing the sleeve being inserted into a wall of the boiler;

Fig. 3 is a similar view after being inserted and secured;

Fig. 4 is a sectional view therethrough;

Fig. 5 is a horizontal sectional view through the sleeve;

Figure 6:
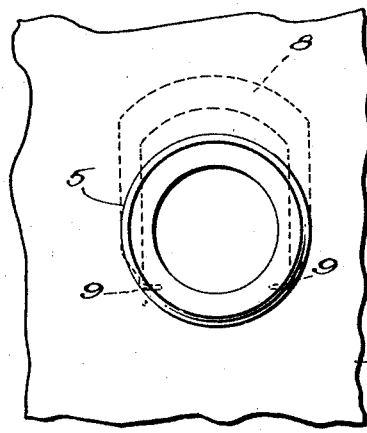
Fig. 6 is an external end elevation of the sleeve being inserted.

The invention may be applied to boilers or other devices to which it might be desired to have a pipe attachment, and while the invention is illustrated in connection with a boiler, it is understood that it is not to be limited thereto but may be used in any desirable relation.

As applied in Fig. 1, the boiler is designated by the numeral 1 and has a pipe 2 extending through a wall thereof and into the boiler from a water heater or stove 3. In this figure, the connection is designated generally by the numeral 4 and is secured to and receives the pipes 2 at the point of their connection through the wall of the boiler.

Figure 7:
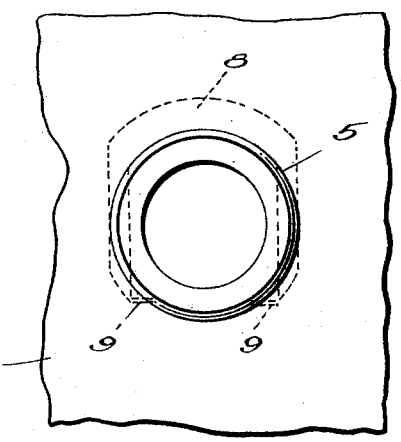
Fig. 7 is a similar view after being inserted.

As shown in the remaining figures of the drawings, the connection 4 comprises a coupling nipple or sleeve 5 having a threaded outer end 6. At its inner end and on the sides thereof, this coupling nipple or sleeve 5 has vertical grooves 7, in which a yoke or saddle 8 is slidably mounted, this yoke or saddle being of the form shown in dotted lines in Figs. 6, 7, and 8. The lower ends of the yoke or saddle 8 may carry spring prongs 9, which are bent under the coupling nipple or sleeve 5 after the saddle has been applied to hold the yoke or saddle against displacement from the sleeve.

In applying the connection to the wall of the boiler or other device, the latter has a hole 10 formed therein slightly larger in diameter than the coupling nipple or sleeve 5. The yoke or saddle 8 is slipped over the sleeve in the grooves 7 and the spring prongs 9 if used are bent toward each other to prevent removal or displacement of the saddle. The saddle is then raised to the position shown in Fig. 2 and, by inclining the sleeve, the inner end may be slipped through the enlarged opening 10, after which it is turned to a horizontal position, and the saddle 8 allowed to drop by gravity to the positions shown in Figs. 3 and 7, the upper part of the saddle resting on the top of the sleeve.

A rubber or other flexible washer 11 may then be applied over the outer end of the sleeve and pressed against the outer side of the wall 1, and a concave metal washer 12 may also be applied, as shown in Fig. 4, both of these being held in place by a nut 13 screwed onto the threaded portion 6 of the sleeve, which is tightened up against the washer and compresses the flexible washer 11, making a tight and rigid connection with the wall of the boiler.

Figure 8:
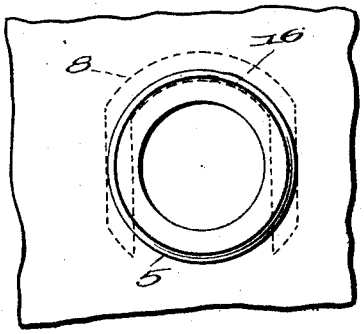
Fig. 8 is a similar view showing a slight modification.

In the form shown in Fig. 8, the sleeve 5 may have a shallow groove 16 in the upper surface thereof to receive the yoke 8 providing a larger bearing surface on the sleeve and effectively holding the latter is place.

If desired, the sides of the sleeve opposite the groove 7 may be provided with reinforcement 17 to increase the strength of the sleeve at these points. This is shown in Fig. 5.

This provides an effective, tight and rigid connection for a pipe with a boiler or other casing or the like, either allowing the pipe to pass into the boiler through the sleeve or the pipe may be threaded into the sleeve for communication with the boiler therethrough.

The pipes 2 are connected with the wall of the boiler 1 at an intermediate point, and extend up inside the boiler which improves the appearance of the construction and eliminates the loss of heat from the pipe if run up on the outside.

I claim:

1. Means for attaching a pipe to a curved tank wall comprising a coupling nipple having grooves in one end portion on diametrically opposite sides, a yoke member having a width approximately equal to the diameter of the nipple and a length greater than the diameter of the nipple and adapted to be disposed in said grooves for anchoring the nipple against outward removal from the tank, and means to clamp the yoke against the wall of the tank.

2. Means for attaching a pipe to a curved tank wall comprising a coupling nipple having grooves in one end portion thereof on diametrically opposite sides, said grooves having the inner sides thereof approximately straight, a rigid yoke member having a width approximately equal to the diameter of the nipple and a length greater than the diameter of the nipple and adapted to be disposed in said grooves for anchoring the nipple against outward removal from the tank, said yoke being constructed and arranged to prevent contraction upon engaging the curved tank wall, and means for clamping the yoke against the wall of the tank.

In testimony whereof I affix my signature.

GEORGE J. VON GLAHN.